Figure 1:
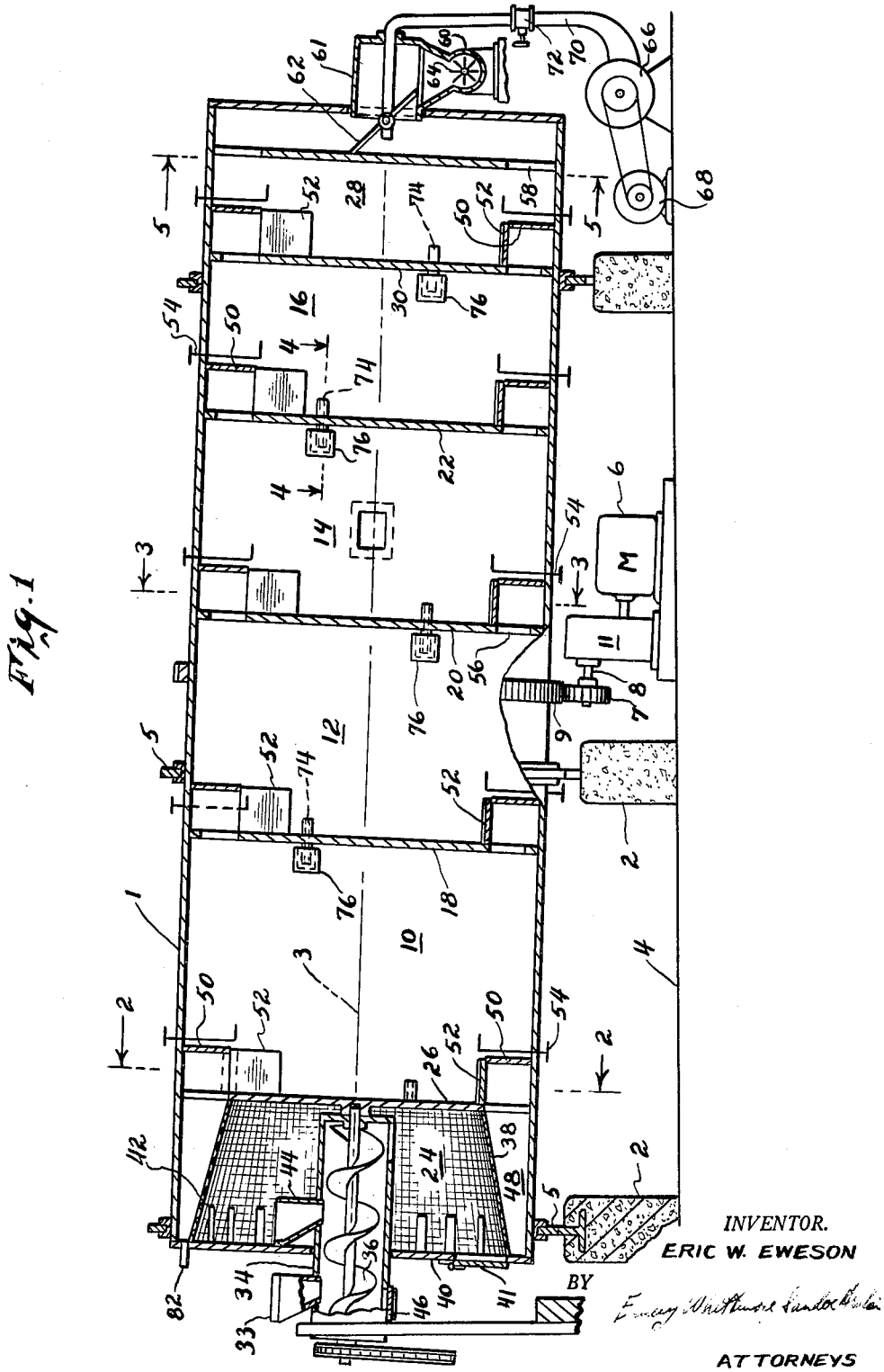

June 23, 1964     E. W. EWESON     3,138,447
MULTISTAGE PROCESS OF PRODUCING ORGANIC FERTILIZER
Filed May 17, 1960     2 Sheets-Sheet 1

INVENTOR.
ERIC W. EWESON
BY
ATTORNEYS

June 23, 1964 E. W. EWESON 3,138,447
MULTISTAGE PROCESS OF PRODUCING ORGANIC FERTILIZER
Filed May 17, 1960 2 Sheets-Sheet 2

INVENTOR.
ERIC W EWESON

BY

ATTORNEYS

United States Patent Office

3,138,447
Patented June 23, 1964

3,138,447
MULTISTAGE PROCESS OF PRODUCING
ORGANIC FERTILIZER
Eric W. Eweson, 735 E. State St., Westport, Conn.
Filed May 17, 1960, Ser. No. 29,707
4 Claims. (Cl. 71—9)

This invention relates to the methods and apparatus for making organic fertilizer from organic waste material.

In my prior patents, No. 2,474,833, No. 2,593,867 and No. 2,680,069, I have described and claimed a method and apparatus for making organic fertilizer by the decomposition of moist organic material through the action of aerobic micro organisms in which air is forced through an enclosed mass of such materials from the bottom of the apparatus and spent air and generated gases are withdrawn at vertically spaced intervals throughout the mass.

While the methods and apparatus disclosed in my prior patents are satisfactory for the production of organic fertilizers, greater speed in large scale quantities is desirable.

I have discovered that decomposition rate can be increased and the volume of compressed air needed for areation can be decreased if microbial inoculation of the organic material and aeration for the process is effected in accordance with the method of the present invention.

Microbial inoculation with a portion of the finished product has been used in the manufacture of baker's yeast. However, yeast fermentation entails the propagation of only one species of micro organisms (the *Saccharomyces cerevisiae* fungi) and such propagation is made in solutions.

Inoculation of non-liquid moist organic material with substantial quantities of the finished product as a culture has been attempted, based on the assumption that composting is analogous to manufacture of baker's yeast. However, while yeast manufacture involves one species of micro organism, compost manufacture involves the propagation in moist solids of a great number of different types and species of micro organisms with greatly varying climatic requirements, and the predominant microbial floras change drastically and frequently during the progress of the process.

For this reason, following the inoculation practice of the yeast industry has not been successful in the manufacture of compost.

Similarly, inoculation of the raw material by small quantities of special, expensive and often secret microbial cultures, which are sold commercially to stimulate compost fermentation, does not improve either processing speed or the quality of the finished product. (See pages 60–62, Technical Bulletin No. 9, Series 37, June 1953, which reports the results of research by the Sanitary Research Project, University of California, Berkeley, California.) In addition to the small amounts of inoculants used, the reason for this result is that the inoculant is grown under different conditions and materials than encountered when they are used. This lack of acclimatization makes them ineffective.

While more complex in reality, compost processing can be practiced in accordance with this invention by considering composting as a fermentation process progressing in at least three, but preferably four, microbiologically distinct stages. The first stage of fermentation is dominated by highly thermophilic species of micro organisms creating temperatures as high as 170° F. The second stage of the process is carried on by moderately thermophilic microbes at about 150° F. The following two stages are characterized by mesophilic microbial activities with temperatures ranging from about 125° F. in the third stage down to about 105° F. in the fourth and last stage.

Variations in carbon dioxide concentration of the air in the fermentation masses in such stages are even greater being as high as 14% (350 times that in the atmosphere) in the first stage, from 5–8% in the second stage, from 2–5% in the third stage, and less than 1% in the final mesophilic stage of the process.

Similarly, the stages may be characterized by their predominant groups and species of micro organisms. Thermophilic fungi predominate in the first stage if the raw material contains appreciable quantities of easily assimilable carbohydrates; otherwise thermophilic bacteria are the most active. Moderately thermophilic bacteria predominate during the second stage. Mesophilic bacteria are the most active micro organisms in the third stage. The fourth stage is characterized by the activities of mesophilic bacteria and actinomycetes.

It is therefore one object of this invention to provide an improved method for fermentation of moist organic materials in which the material is treated in stages, the climate in each stage is controlled for optimum growth of the stage micro organisms, and the material in each stage inoculated with micro organisms developed in the climate of the stage.

It is a further object of this invention to provide an improved apparatus for carrying out of compost fermentation.

In accordance with these objects, and in accordance with the preferred practice of the method of this invention, the raw organic material is treated in stages. The climate in each stage is maintained for the optimum development of the types and species of the micro organisms predominant in that stage. In each stage, the material is inoculated with the predominant types of micro organisms which have been cultured in the stage climate. After treatment, the material is excessively aerated to arrest the fermentation, free the material from generated gases and dry it for bagging and shipping.

For practice of this method I have provided, in its preferred form, a digester mounted for rotation about an axis inclined to the horizontal. The digester is divided into compartments by partitions spaced along the axis of rotation. Each partition is provided with transfer buckets which are selectably opened and which, when opened, transfer material from compartment to the next lower compartment without allowing significant change in the climate of the connected compartments.

Air is forced through the entire digester from the lower end thereof, and spent air is selectably vented from each stage or compartment to maintain the climate therein optimum for the micro organisms predominant in such stage. A portion of the treated material is left in each stage as a culture for inoculation of transferred material and the entire digester is rotated to ensure efficient aeration and complete mixing with and inoculation of the transferred material.

Figure 2:
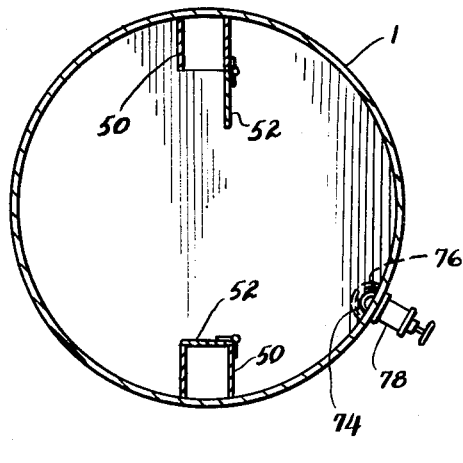
Figure 3:
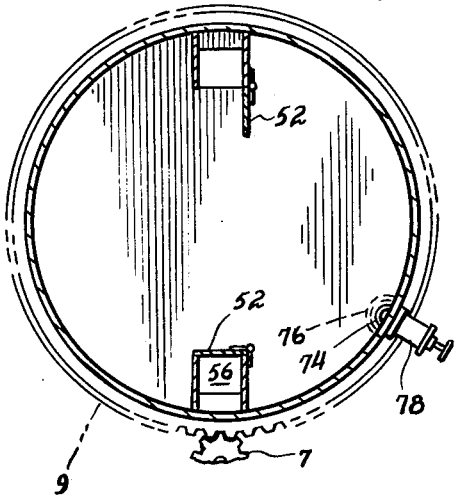
Figure 4:
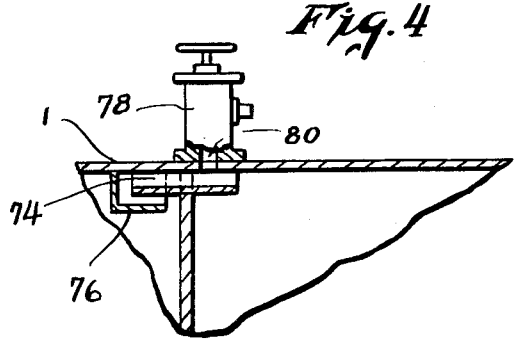
Figure 5:
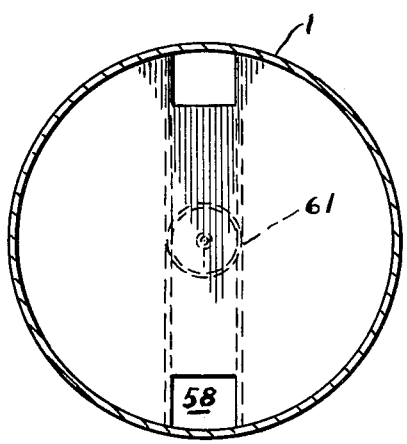

A preferred embodiment of the apparatus according to this invention which is suitable for carrying out the method of this invention is shown in the accompanying drawing, of which:

FIG. 1 is a vertical cross section through the apparatus;
FIG. 2 is a section taken along lines 2—2 of FIG. 1;
FIG. 3 is a section taken along lines 3—3 of FIG. 1;
FIG. 4 is an enlarged section through one of the air distributor valves in the apparatus shown in FIG. 1; and
FIG. 5 is a section taken along lines 5—5 of FIG. 1.

In the figures there is shown a digester 1 comprising a drum mounted on bearing blocks 2 for rotation about an axis 3 which is slightly inclined with respect to the horizon 4 to allow gravity feed of the material through the length of the drum.

At each of the bearing points a suitable bearing 5 is provided for rotatable mounting of the drum. The drum may be rotatably driven by motor 6 through the cooperation of pinion 7 on the drive shaft 8 thereof with the annular gear 9 surrounding the drum. A suitable reduction gear 11 is often desirable.

The digester is divided into four fermentation chambers 10, 12, 14 and 16 by partitions 18, 20, 22 respectively. A screening chamber 24 is separated from the digester by partition 26 and a drying chamber 28 is separated from fermentation chamber 16 by partition 30.

The raw material, such as municipal garbage, is introduced into the digester through hopper 33 on the stationary casing 34 of a screw conveyor 36. The material is discharged on the far end of a conical screen 38. The screen 38 is fixedly mounted to the digester end wall 40 and partition 26 and is pitched so that the material will move towards the end wall 40 during screening.

The screen is of coarse mesh, with not less than 2″ openings, since only coarse screening or grinding of the material is necessary. The tailings, such as shoes, stones, metal objects and other heavy non-decomposable objects which abound in municipal refuse, aid in the screening and grinding. The tailings collect near the end wall 40 and may be periodically removed through port 41. Alternately, the tailings may be picked up by flanges or baffles 42 which deposit the tailings in hopper 44. The tailings may then be extracted by opening the discharge door 46 and reversing the screw conveyor drive. During screening, the tailings may be recirculated through hopper 44 to aid in grinding and screening material or the hopper may be mechanically closed.

The screened material is transferred from compartment 48 to compartment 10 of the digester by means of transfer buckets or pockets 50. The transfer pocket in the partition is merely a box open to the upper stage (here compartment 48) and is provided with a hinged bottom 52. The pockets fill with material and when gravity opens the bottom, the material is discharged into the successive compartment. The transfer can thus be made from a partially filled chamber even though the subsequent chamber is quite full. To preclude material transfer until desired, the buckets are provided with lock toggles 54 operable from outside the digester.

Similarly, partitions 18, 20, 22 and 30 are provided with transfer pockets. In these partitions, however, the opening 56 to the pocket is displaced from the periphery of the partition to prevent complete emptying of chambers 10, 12, 14 and 16 respectively.

To unload the digester there is provided transfer buckets 58 which feed material from chamber 28 to the discharge air lock 60 via chute 62 in the non-rotating discharge end 61 of the digester. The air lock is provided with a plurality of vanes 64 which are rotatably driven to discharge material without opening chamber 28 to the atmosphere.

Control of the climate in each of the fermentation chambers 10, 12, 14 and 16 and drying chamber 28 is best understood by assuming that material under fermentation is enclosed therein.

Air is forced through the entire digester by compressor 66 driven by motor 68 and introduced into the digester via pipe 70 and valve 72. The air passes through an air hole or passage 74 in the periphery of each partition. To prevent material from passing through or clogging the passage, a guard structure 76 is provided. By positioning the air holes in staggered relationship in adjacent partition, movement of the air through the fermenting mass is ensured. For example, if passages in adjacent partitions are at diagonally opposed position, the air takes a zigzag path through the digester passing through all the material therein.

As the air passes through the chambers, it picks up generated gases, particularly $CO_2$. Thus, the concentration increases through the digester chambers. To control the aeration flow and thus to control the climate of each compartment to provide optimum conditions for growth of the predominant micro organisms in each chamber, there is provided a valve 78 to bleed off excess air and gases from the chamber through passage 80. The screen compartment is vented by vent 82 which need not be valved since all residual gases are exhausted therethrough.

The method of the invention may best be seen by assuming that all chambers are loaded with material inoculated with the predominant micro organisms for each stage. The digester is rotated and air forced in the drying chamber 28 in proper quantity and, if desired, at an elevated temperature to better dry the material to baggable dryness. As the drying flow normally will exceed the aeration flow necessary in chamber 16, a portion of the air must be valved to the atmosphere through the valve in air passage 74 through partition 30 and only the remainder of the air forced into compartment 16. The fermenting mass is thus properly aerated to stimulate fermentation without over-aeration or under-aeration either of which inhibits such fermentation. The air passing therethrough now gains in temperature, humidity and $CO_2$ concentrations. Portions of this air are passed into chamber 14 for climatic control thereof. Similarly, the process is repeated for chamber 12 and 10.

The exact quantities of air for each chamber are most easily determined by temperatures and $CO_2$ concentrations of the fermenting mass. However, for guidance, I have found that the maximum requirements for conditioned air are:

Chamber 16 _____ 25 cu.ft./min./100 cu.ft.mtl.
Chamber 14 _____ 15 cu.ft./min./100 cu.ft.mtl.
Chamber 12 _____ 10 cu.ft./min./100 cu.ft.mtl.
Chamber 10 _____  5 cu.ft./min./100 cu.ft.mtl.

It will be appreciated that the quantities of air necessary for aeration are stictly prorationed, are very low in comparison with other types of processing and that no fresh atmospheric air reaches the material at any of the fermenting stages. The tumbling of the material in the drum prevents air channel formation and thereby ensures aeration.

In operation, the digester will normally be controlled to provide the proper climatic conditions for each of the fermentation chambers in accordance with the requirements of temperature and $CO_2$ concentrations as set forth above. The air flow will fall within the suggested ranges and normally will be further controlled by the operator by measurement of the temperature and the $CO_2$ concentration in each chamber. If for instance the $CO_2$ concentration of the air in the mass falls below that established for proper climatic control in which case the temperature is also likely to be too low, this will serve as an indication that the chamber is receiving excessive aeration air flow and the valve in the air passage through the partition next below the chamber can be opened to release more air to the atmosphere. On the other hand, if the temperatures exceed the optimum temperatures desired and the $CO_2$ concentrations are too high, this is an indication that too little aeration air is being received by the chamber and the valves can be partially shut.

When the fermentation in chamber 16 is completed, the material can be transferred to the drying chamber 28 to arrest the process and dry the material to the proper dryness for packaging. However, since the transfer pockets are displaced from the periphery of the chamber, a fixed quantity of the material will remain in the chamber. This material serves as an inoculant for new material in this chamber. It will be noted that the predominant micro organisms for the stage of fermentation are at the optimum of development and the chamber climate is maintained at optimum conditions for development of such micro organisms in the new material.

Thus, when the material in chamber 14 is transferred to chamber 16, the rotation of the digester will thoroughly mix the new material with the material remaining in chamber 16 to thoroughly inoculate the new material with the developed bacteria. The inoculation by complete mixing is necessary due to the low migration rate of the micro organisms. Similarly, the inoculation is effective since the climate is maintained with such conditions as to nurture the development of the specific micro organisms in this stage of fermentation.

Similarly, the materials in chambers 10 and 12 are transferred from stage to stage of fermentation and new material is added to chamber 10 as necessary.

In this manner, considerable quantities of material can be processed in relatively short time in a stepped-flow type of process which becomes virtually a continuous flow process. In one digester, as much as 50 tons of material may be processed in each fermentation chamber and will complete its development within a 24 to 48 hour period depending on the type of material processed.

Thus, it can be seen that composting in specific stages of aerobic fermentation in which each stage is inoculated with the predominant micro organisms for that stage in a climate controlled to provide optimum development of each group of such predominant micro organisms greatly increases the efficiency of the compost manufacturing process and improves the quality of the resultant fertilizer. The completed process results in a decomposed and permanently stabilized product which will not undergo renewed fermentation and putrefication when the material is bagged or put in piles with the air supply cut off.

This invention may be variously embodied and modified within the scope of the subjoined claims.

What is claimed is:

1. The method of making organic fertilizer from moist natural organic material such as municipal garbage and sewage sludge in a multistage process wherein a portion of the treated material in each of the stages serves as an inoculant for the material entering such stages which comprises the steps of:

establishing at least three successive stages for the treatment of the material by highly thermophilic, moderately thermophilic and mesophilic groups of aerobic microorganisms, controlling the climate, including temperature and $CO_2$ concentration in the respective stages to be conducive to the optimum development of said highly thermophilic, moderately thermophilic, and mesophilic groups of aerobic microorganisms, treating material in each of said controlled climate stages to propagate said highly thermophilic, moderately thermophilic and mesophilic groups of microorganisms in the respective stages, climatically controlled for optimum development thereof, transferring a portion of the material treated in each stage to the following stage in the sequence recited without substantially changing the climatic conditions of the stages and without exposing the material to atmospheric air during said transfer, thoroughly inoculating the portion of the material transferred into each stage with the untransferred material left in such stage and substantially maintaining said controlled climatic conditions of each of such stage during treatment of said material by the respective group of microorganisms therein, and recovering an organic fertilizer from said mesophilic stage.

2. The method in accordince with claim 1 in which the climate in said first stage has a temperature range between 150° F. and 170° F. and a $CO_2$ concentration between 8% and 14%; the climate in said second stage has a temperature range between 125° F. and 150° F. and a $CO_2$ concentration between 5% and 8%; and the climate in said third stage has a temperature range between 105° F. and 125° F. and a $CO_2$ concentration between 1% and 5%.

3. The method in accordance with claim 1 in which the climate of each stage is derived from the exhaust gases generated in a preceding stage.

4. The method in accordance with claim 1 in which said material is treated sequentially in enclosed chambers, and which includes forcing air through all of said chambers and the material enclosed therein in direction opposite to the direction of material transfer, and withdrawing spent air and gases from each of said chambers to control the climate therein.

References Cited in the file of this patent

UNITED STATES PATENTS

| | | |
|---|---|---|
| 1,831,091 | Bowers | Nov. 10, 1931 |
| 2,043,265 | Roeder | June 9, 1936 |
| 2,474,833 | Eweson | July 5, 1949 |
| 2,680,069 | Eweson | June 1, 1954 |
| 2,820,703 | Dresser et al. | Jan. 21, 1958 |
| 2,864,672 | Brooks | Dec. 16, 1958 |
| 2,867,521 | Jeffreys | Jan. 6, 1959 |
| 2,878,112 | Morrison | Mar. 17, 1959 |
| 2,929,688 | Riku et al. | Mar. 22, 1960 |
| 2,948,593 | Larson | Aug. 9, 1960 |
| 2,954,285 | Carlson et al. | Sept. 27, 1960 |
| 3,041,148 | Ballantyne et al. | June 26, 1962 |
| 3,041,157 | Crane et al. | June 26, 1962 |